United States Patent
Williams et al.

(10) Patent No.: US 11,659,071 B2
(45) Date of Patent: May 23, 2023

(54) PACKET PROCESSING

(71) Applicant: MetaSwitch Networks Ltd., Enfield (GB)

(72) Inventors: Matthew Ian Ronald Williams, London (GB); Richard John Whitehouse, London (GB); Christopher Neil Swindle, Biggieswade (GB); Colin Reynolds, Edinburgh (GB)

(73) Assignee: MetaSwitch Networks Ltd., Enfield (GB)

( * ) Notice: Subject to any disclaimer, the term of this patent is extended or adjusted under 35 U.S.C. 154(b) by 0 days.

(21) Appl. No.: 17/535,351

(22) Filed: Nov. 24, 2021

(65) Prior Publication Data
US 2022/0166856 A1 May 26, 2022

(30) Foreign Application Priority Data
Nov. 25, 2020 (GB) ...................... 2018535

(51) Int. Cl.
*G06F 15/78* (2006.01)
*G06F 15/80* (2006.01)
*G06F 16/22* (2019.01)
*G06F 16/31* (2019.01)
(Continued)

(52) U.S. Cl.
CPC .......... *H04L 69/22* (2013.01); *H04L 2212/00* (2013.01)

(58) Field of Classification Search
None
See application file for complete search history.

(56) References Cited

U.S. PATENT DOCUMENTS

2003/0179780 A1* 9/2003 Walker ............... H04J 3/0664
370/508
2007/0203960 A1 8/2007 Guo
(Continued)

OTHER PUBLICATIONS

Hart, et al., "Performance of memory reclamation for lockless synchronization", In Journal of Parallel and Distributed Computing, vol. 67, Issue 12, Dec. 2007, pp. 1270-1285.
(Continued)

*Primary Examiner* — Duc T Duong
(74) *Attorney, Agent, or Firm* — Han Gim; Newport IP, LLC

(57) ABSTRACT

In operation, packets traverse the packet processing data structure, and the network processing represented by each object in the data structure is applied to each packet. From time to time, the packet processing data structure may need to be updated. Embodiments of the present disclosure provide for lock-free updating of a packet processing data structure by means of epoch-based garbage collection. In embodiments, a particular past packet processing epoch is considered to be no longer referenced by any cores when the sequence numbers recorded in each said memory location are different to the sequence number of that particular past packet processing epoch. The deletion thread checks both whether a past epoch is being referenced by any packets and whether it is being reference by any cores. Thus memory is safely freed without having any impact on any packet processing which may be occurring in parallel to the deletion thread.

20 Claims, 12 Drawing Sheets

1200

1210 Establish that a particular past packet processing epoch is no longer in use.

1220 Delete any objects contained in the deletion list of that particular past packet processing epoch.

(51) Int. Cl.
   *G06F 16/41*   (2019.01)
   *H04L 69/22*   (2022.01)

(56) References Cited

U.S. PATENT DOCUMENTS

| | | | |
|---|---|---|---|
| 2012/0109913 A1* | 5/2012 | Rajure | H04L 45/54 |
| | | | 707/694 |
| 2016/0267005 A1* | 9/2016 | Natarajan | G06F 3/0608 |
| 2022/0197831 A1* | 6/2022 | Gorodetsky | H04L 45/28 |

OTHER PUBLICATIONS

"International Search Report and Written Opinion Issued in PCT Application No. PCT/US21/060856", dated Mar. 14, 2022, 9 Pages.
"Search Report Issued in United Kingdom Patent Application No. 2018535.1", dated Aug. 6, 2021, 3 Pages.

* cited by examiner

PACKET PROCESSING

PRIORITY APPLICATION

The present application is claims priority to GB Application Serial Number 2018535.1, entitled "PACKET PROCESSING," filed on Nov. 25, 2020, the contents of the listed application are hereby incorporated by reference in their entirety.

TECHNICAL FIELD

The present disclosure concerns packet processing. More particularly, but not exclusively, this disclosure concerns measures, including methods, apparatus and computer programs, for use in processing packets.

BACKGROUND

Packet processing pipelines may be decomposed into a packet processing data structure, such as a graph data structure, consisting of a number of objects or nodes defining packet processing operations. In operation, packets traverse the packet processing data structure, and the network processing represented by each object in the data structure is applied to each packet. From time to time, the packet processing data structure may need to be updated. Updating the packet processing data structure sometimes involves adding or removing nodes. Even when simply updating an existing node, the safest way to do this may be to add a new node similar to the one that needs updating, and then remove the old (now out-of-date) node. As a consequence of such updating, objects may no longer be required, such that it is desired to delete them in order to free memory, thereby making it available for further processes. In some scenarios, such as in a highly dynamic network environment, many such updates may be performed each second. It has previously been challenging to handle updates to the packet processing data structure without adversely impacting the concurrent throughput of packets through the packet processing data structure. For example, known methods may give rise to packet timing jitter or even completely prevent packets from being processed whilst updates are being applied to the packet processing data structure.

The present disclosure seeks to reduce the impact of updates to the packet processing data structure on packet throughput.

SUMMARY

According to a first aspect, there is provided a method of processing packets, the method comprising: receiving a plurality of packets; at one or more of multiple cores, executing packet processing threads comprising: identifying a current packet processing epoch and storing a reference to it on each packet of the plurality of packets; incrementing a counter of the current packet processing epoch by the number of packets contained in the plurality of packets; processing the plurality of packets according to a packet processing data structure, the packet processing data structure comprising one or more objects defining packet processing operations; and in response to completion of processing of each packet of the plurality of packets according to the packet processing data structure, decrementing the counter of the packet processing epoch referenced by that packet, at one of the cores, executing a programming thread comprising: committing an update to the packet processing data structure, wherein any objects of the packet processing data structure which become redundant as a result of the update are added to a deletion list of the current packet processing epoch, the deletion list defining objects which can be deleted at a future point in time; and defining a new packet processing epoch, designating the current packet processing epoch as a past packet processing epoch, and designating the new packet processing epoch as the current packet processing epoch, and at one of the cores, executing a deletion thread comprising: establishing that a particular past packet processing epoch is no longer in use and deleting any objects contained in the deletion list of that particular past packet processing epoch.

According to a second aspect, there is provided a computer program product comprising a set of instructions, which, when executed by a computerised device, cause the computerised device to perform a method of processing packets, the method comprising: receiving a plurality of packets; at one or more of multiple cores, executing packet processing threads comprising: identifying a current packet processing epoch and storing a reference to it on each packet of the plurality of packets; incrementing a counter of the current packet processing epoch by the number of packets contained in the plurality of packets; processing the plurality of packets according to a packet processing data structure, the packet processing data structure comprising one or more objects defining packet processing operations; and in response to completion of processing of each packet of the plurality of packets according to the packet processing data structure, decrementing the counter of the packet processing epoch referenced by that packet, at one of the cores, executing a programming thread comprising: committing an update to the packet processing data structure, wherein any objects of the packet processing data structure which become redundant as a result of the update are added to a deletion list of the current packet processing epoch, the deletion list defining objects which can be deleted at a future point in time; and defining a new packet processing epoch, designating the current packet processing epoch as a past packet processing epoch, and designating the new packet processing epoch as the current packet processing epoch, and at one of the cores, executing a deletion thread comprising: establishing that a particular past packet processing epoch is no longer in use and deleting any objects contained in the deletion list of that particular past packet processing epoch.

According to a third aspect, there is provided an apparatus for use in processing packets, the apparatus being configured to: receive a plurality of packets; at one or more of multiple cores, execute packet processing threads comprising: identifying a current packet processing epoch and storing a reference to it on each packet of the plurality of packets; incrementing a counter of the current packet processing epoch by the number of packets contained in the plurality of packets; processing the plurality of packets according to a packet processing data structure, the packet processing data structure comprising one or more objects defining packet processing operations; and in response to completion of processing of each packet of the plurality of packets according to the packet processing data structure, decrementing the counter of the packet processing epoch referenced by that packet, at one of the cores, execute a programming thread comprising: committing an update to the packet processing data structure, wherein any objects of the packet processing data structure which become redundant as a result of the update are added to a deletion list of the current packet processing epoch, the deletion list defining objects which can be deleted at a future point in time; and defining a new packet processing epoch, designating the current packet processing epoch as a past packet processing epoch, and designating the new packet processing epoch as the current packet processing epoch, and at one of the cores, execute a deletion thread comprising: establishing that a particular past packet processing epoch is no longer in use and deleting any objects contained in the deletion list of that particular past packet processing epoch.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
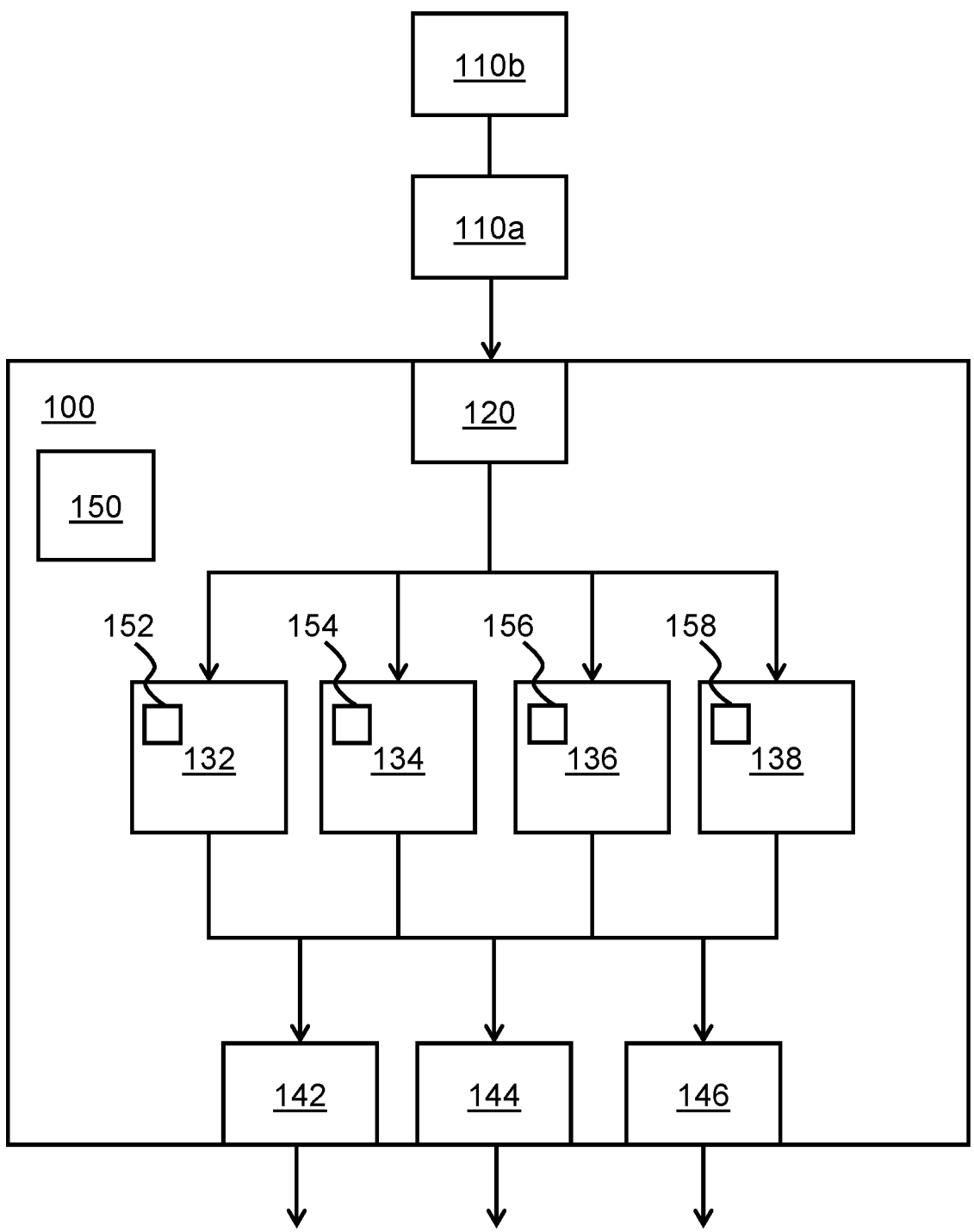
FIG. 1 shows a schematic view of an apparatus for processing packets according to embodiments of the present disclosure.

With reference to FIG. 1, an apparatus 100 for processing packets according to an embodiment of the present disclosure comprises an interface 120 for receiving packets 110a, 110b, multiple processing cores 132, 134, 136, 138 operatively connected to the interface 120 and multiple output interfaces 142, 144, 146 operatively connected to the processing cores. A main memory 150 is accessible to each of the processing cores. In addition, each processing core may have an associated local cache memory 152, 154, 156, 158.

In embodiments, one or more of the multiple cores execute packet processing threads, whilst another core or cores execute a programming thread (for updating the packet processing data structure) and a deletion thread. For example, three processing cores 132, 134 and 136 may be executing packet processing threads whilst a single processing core 138 executes the programming and deletion threads, although other distributions of thread execution are contemplated.

Figure 2:
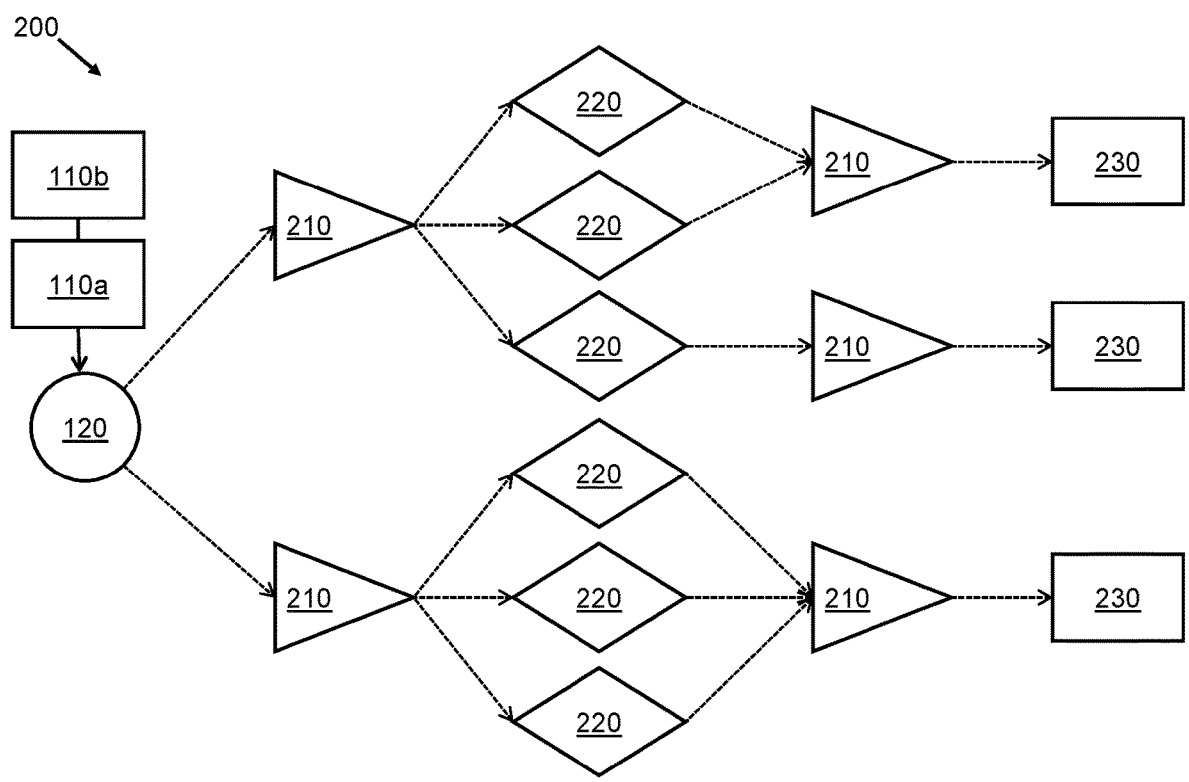
FIG. 2 shows a schematic view of a packet processing data structure according to embodiments of the present disclosure.

With reference to FIG. 2, in operation, packets 110a, 110b are received at the interface 120 and are processed through a packet processing data structure 200. The data structure may for example comprise a graph data structure, a list data structure and/or a tree data structure. For example, in FIG. 2, packet 110a arrives at the interface before packet 110b, and further packets may follow. Processing of packets is performed by executing packet processing threads on one or more of the multiple processing cores. The packet processing data structure generally comprises different objects 210, 220, 230, defining packet processing operations. Example objects include packet parameter checks 210, matching operations 220 and actions taken on the packets 230. Actions may include dropping a packet or forwarding it to one of the output interfaces 142, 144, 146, for example. The skilled person would be familiar with such objects in the context of packet processing. Copies of some objects of the packet processing data structure are taken by the processing cores when they process a packet. Packets then traverse the packet processing data structure taking references to other objects in the data structure as they do so.

From time to time, objects may need to be added to the data structure, updated or deleted from the data structure. Deletion of redundant objects may be desirable in order to free memory and make it available for further processes. Embodiments of the present disclosure are concerned with the issue of updating the packet processing data structure 200 without adversely affecting the processing throughput of packets. The inventors have appreciated that it has previously been challenging to efficiently and safely add, update or delete objects whilst having uninterrupted packet throughput. Furthermore, it has been challenging to handle occasions when packets switch between different processing cores, taking with them references to objects. It has been appreciated that for performance reasons, it is desirable to have a lock-free method of freeing objects of the packet processing data structure 200 from memory when they are no longer required. "Lock-free" in this context generally implies that packet processing threads can start, continue and finish execution irrespective of what updates/deletions are being made to the packet processing data structure 200 at the same time. This is especially challenging since objects are referenced from multiple cores with many references being continually taken and freed to those objects. Embodiments of the present disclosure provide for lock-free updating of the packet processing data structure by means of epoch-based garbage collection.

Figure 3:
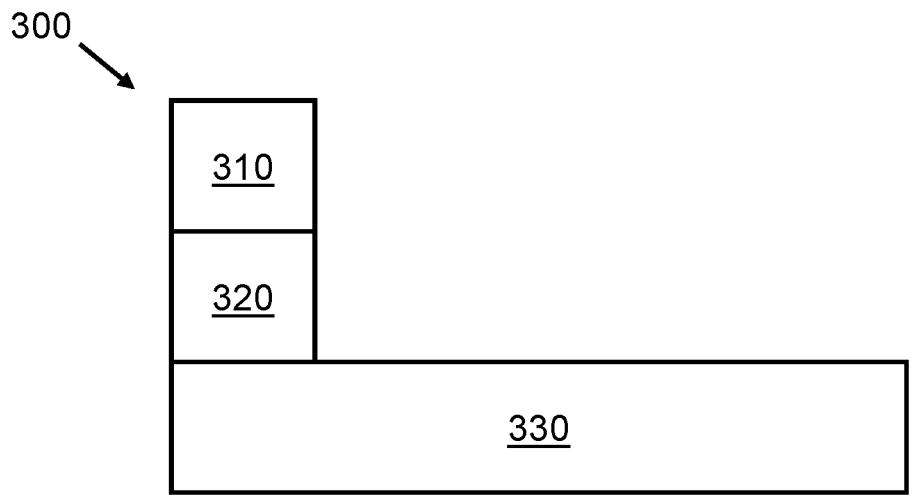
FIG. 3 shows a schematic view of a packet processing epoch according to embodiments of the present disclosure.
Figure 5:
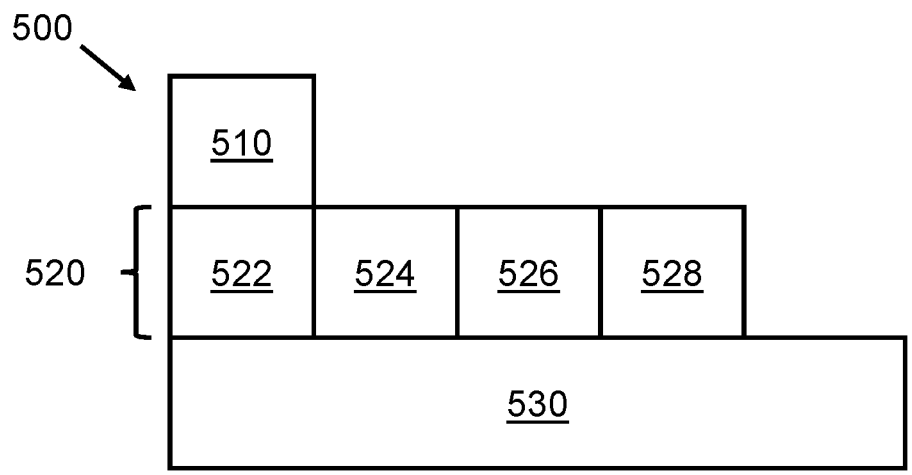
FIG. 5 shows a schematic view of a packet processing epoch according to embodiments of the present disclosure.

Before describing the processing, programming and deletion threads in more detail, it is instructive to introduce the structure of a packet processing epoch. FIG. 3 illustrates schematically the structure of a packet processing epoch 300 in memory 150 according to an embodiment. The packet processing epoch 300 consists of a sequence number 310, a counter 320 and a deletion list 330. FIG. 5 illustrates schematically the structure of a packet processing epoch 500 in memory according to an alternative embodiment in which the packet processing epoch 500 consists of a sequence number 510, a counter 520 and a deletion list 530. In the embodiments of FIG. 5, the counter 520 comprises an array of counter elements 522, 524, 526, 528. Each counter element in the array may be associated with a respective one of the processing cores on which packet processing threads are executed.

The epoch sequence number 310, 510 is effectively a label used to uniquely identify each packet processing epoch in memory. In embodiments, multiple epochs exist in memory at any one point in time. These consist of a current epoch and one or more past epochs. In embodiments, each time a new epoch is created it is allocated a sequence number which is incremented from the sequence number of the immediate previous epoch. However, due to integer overflow wrapping, in some instances the sequence number of the new epoch may revert to "0" or "1". The deletion list defines objects of the packet processing data structure which can be deleted at an appropriate future point in time. The counter is used by a deletion thread in determining whether the objects can be safely deleted. The full purpose of the sequence number 310, 510, counter 320, 520 and deletion list 330, 530 will become apparent with reference to the following description.

Figure 4:
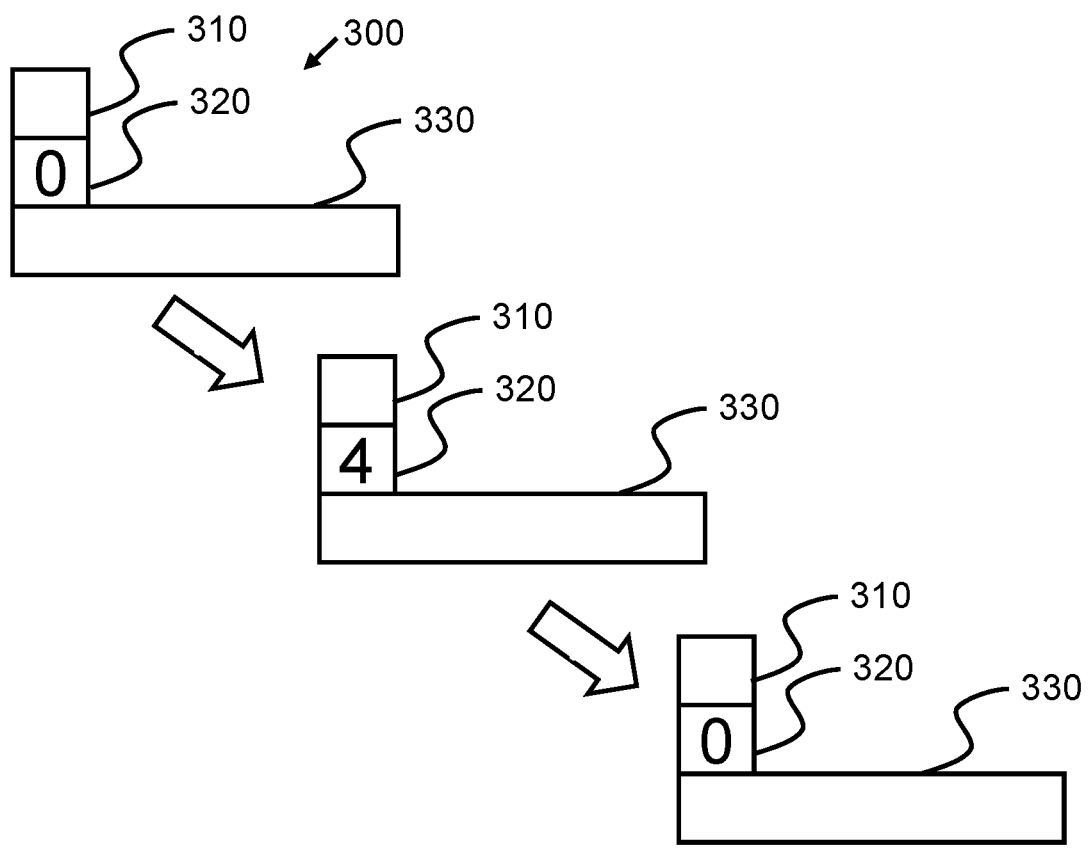
FIG. 4 illustrates schematically the evolution of the counter of a packet processing epoch according to embodiments of the present disclosure.

In operation, one or more of the multiple cores in the apparatus 100 perform packet processing on packets 110a, 110b by executing packet processing threads. Initially, a current packet processing epoch 300 is identified and a reference to the current packet processing epoch is stored on each packet of a plurality of packets. For example, the plurality of packets may comprise two or more received packets 110a, 110b which have been queued for processing in one batch or burst. In embodiments, the reference is a pointer to the current packet processing epoch, the pointer being stored on each packet. With reference to FIG. 4, the counter 320 of the current epoch is incremented by the number of packets contained in the plurality of packets. The core or cores then process the packets according to the packet processing data structure 200. In response to completion of processing of each packet of the plurality of packets according to the packet processing data structure, the counter 320 of the epoch 300 referenced by that packet (e.g. pointed to by the pointer stored on that packet) is decremented. FIG. 4 illustrates the evolution of the value of the counter 320 as a plurality of packets is processed. The value of the counter is initially "0", prior to receiving the plurality of packets for processing. If the plurality of packets contains four separate packets, the counter 320 is incremented four times to a value "4" prior to processing the packets according to the packet processing data structure. Then, as each packet finishes being processed, the counter 320 is decremented by one. Therefore, in this example, the counter is reverted to "0" after the core has processed all packets in the plurality of packets.

Figure 6:
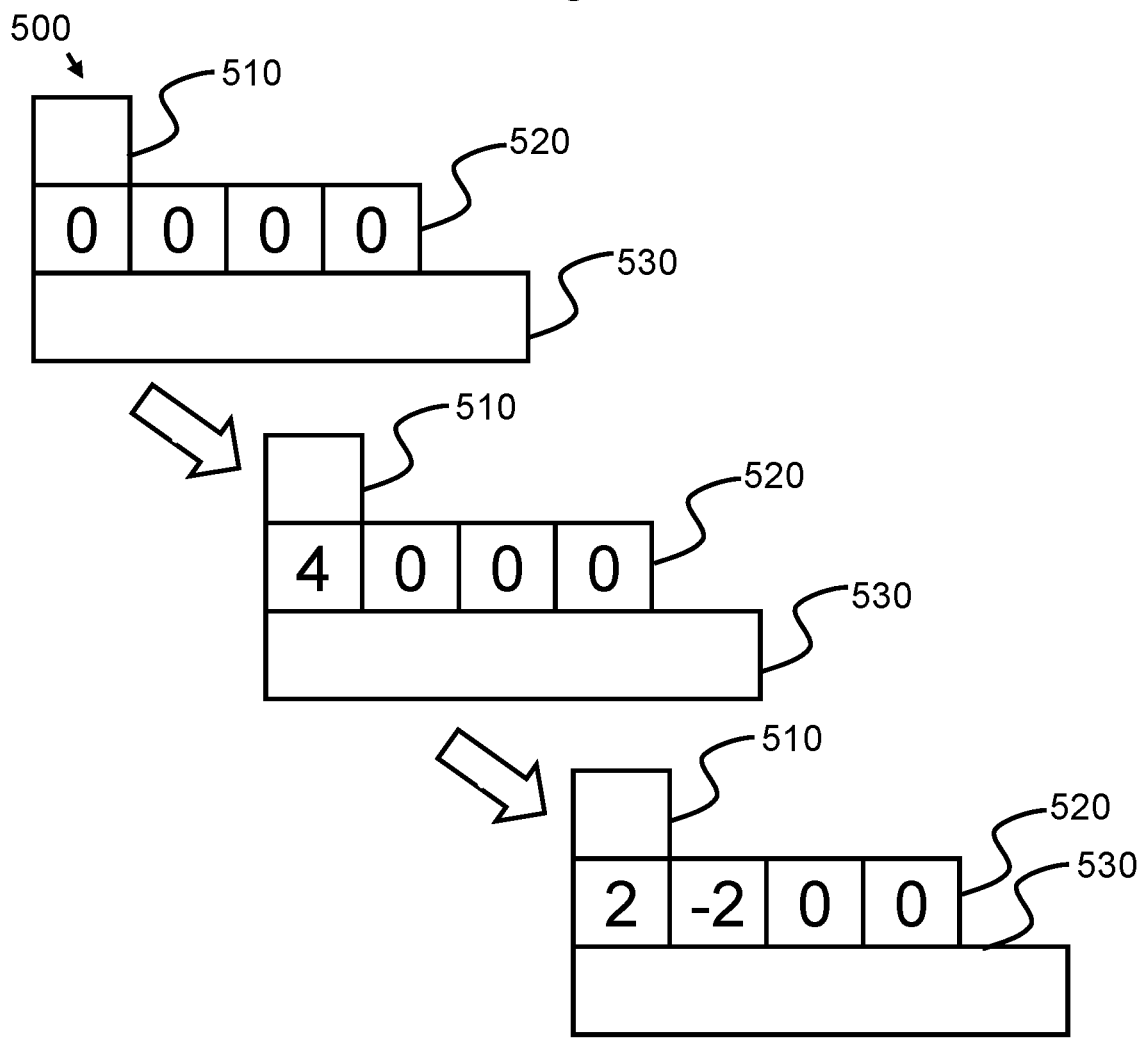
FIG. 6 illustrates schematically the evolution of the counter of a packet processing epoch according to embodiments of the present disclosure.

In embodiments which employ the epoch structure 500 according to FIG. 5, with multiple counter elements, an example evolution of the counter element values is illustrated with reference to FIG. 6. Initially, as before, the current packet processing epoch 500 is identified and a reference (e.g. pointer) to the current packet processing epoch is stored on each packet of the plurality of packets. Each of the counter elements is usually associated with a respective one of the plurality of cores executing packet processing threads. The cores may process respective packets of the plurality of packets in parallel. For example, a single core may initially process all packets of the plurality, but as the packets of the plurality of packets traverse the packet processing data structure, some packets may switch to other cores, whilst others may continue being processed by the initial core.

Initially, the counter of the current epoch 500 is incremented by the number of packets contained in the plurality of packets. If a first core initially processes all packets, only one of the counter elements, the one associated with the first core, is incremented by the total number of packets contained in the plurality of packets. For example, if the plurality of packets contains four packets, then counter element 522 in FIG. 5 may be incremented four times to a value "4", but the other counter elements 524, 526, 528 are not incremented. The cores then process the packets according to the packet processing data structure 200. In this multi-core example, packets may switch to other cores during processing. In response to completion of processing of each packet of the plurality of packets according to the packet processing data structure, a counter element of the packet processing epoch referenced by that packet is decremented. The counter element which is decremented is the counter element corresponding to the core which completes processing of the packet. Thus, for example, if the first core completes processing on two of the four packets then counter element 522 is decremented by two (from "4" to "2"). If a second core, with associated counter element 524, completes processing of the other two packets of the plurality of packets, then counter element 524 is decremented by two (from "0" to "−2"). Thus if initially the counter elements all have the value "0", after completing processing of the plurality of packets, the counter elements assume values "2", "−2", "0" and "0", as depicted in FIG. 6. In other words, in a multi-core packet processing scenario, one or more of the counter elements can assume negative values.

In embodiments, each counter element 522, 524, 526, 528 is stored at a respective memory location local to the associated core of the plurality of cores. For example, each core involved in executing packet processing threads stores a respective counter element in its local (or 'internal') cache 152, 154, 156, 158. In this manner, cores can update the value of their corresponding counter element without addressing the main memory 150, with consequent performance improvement. It should be appreciated that the packet processing epoch structure 300 according to FIG. 3 can still be utilized when multiple cores are executing packet processing threads. However, since multiple cores will need to update the single counter 320, the main memory 150 (external to the cores) will be addressed more frequently than is the case where separate counter elements 522-528 are stored in local caches 152, 154, 156, 158.

Aside from executing packet processing threads, as described above, in embodiments at least one of the cores is also involved in executing a programming thread from time to time. The programming thread is used to commit an update to the packet processing data structure 200. For example, objects 210, 220, 230 may be added or removed from the packet processing data structure. In embodiments, such updates may be due to adding or removing network subscribers, for example. In some highly dynamic network environments, it is anticipated that many such packet processing data structure updates may be performed each second, for example in excess of 1000 per second. By way of example, with reference to FIG. 7, a number of objects 240 are to be deleted as a result of an update to the packet processing data structure 200. However, rather than immediately deleting the objects 240 from memory 150, references to them are instead added to the deletion list 330, 530 of the current epoch 300, 500. Actual deletion of the objects 240 from memory 150 is conditional and is performed later at an appropriate time by a deletion thread, as described in more detail below.

Figure 8A:
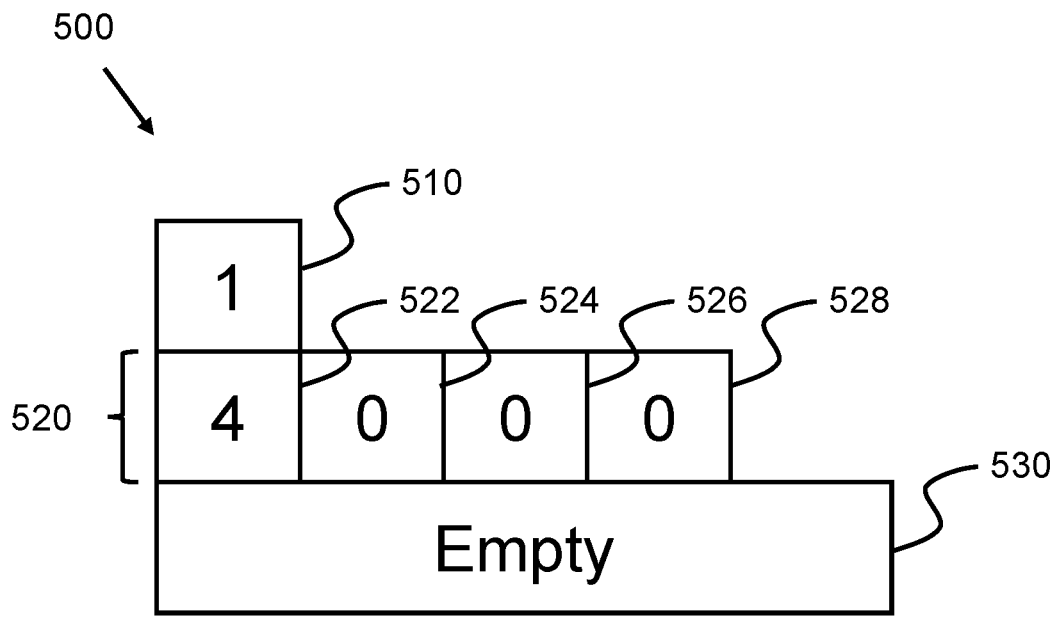
FIGS. 8a to 8c illustrate schematically the evolution of packet processing epochs during packet processing and packet processing data structure programming according to embodiments of the present disclosure.

An example of the evolution of packet processing epochs during packet processing and programming is illustrated with reference to FIGS. 8a to 8c. FIG. 8a shows the state of the current packet processing epoch 500, with an epoch sequence number 510 having the value "1" prior to executing a programming thread to update the packet processing data structure. One of the cores is executing a packet processing thread and has received four packets and incremented its respective counter element 522 in the epoch 500 to a value of "4". The other counter elements 524, 526 and 528 have the value "0". The deletion list 530 is initially empty and the packet processing data structure, on the basis of which the cores are processing packets, may correspond to that depicted in FIG. 2, for example.

Figure 7:
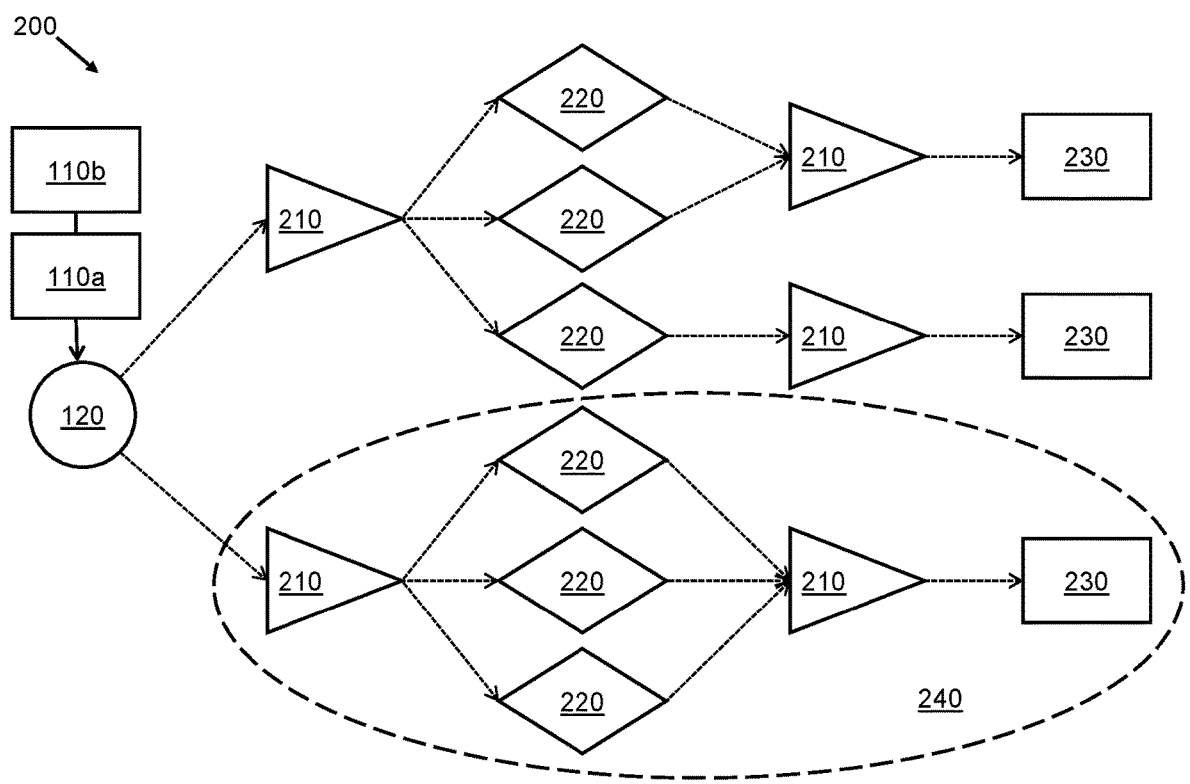
FIG. 7 shows a schematic view of an update to a packet processing data structure according to embodiments of the present disclosure.
Figure 8B:
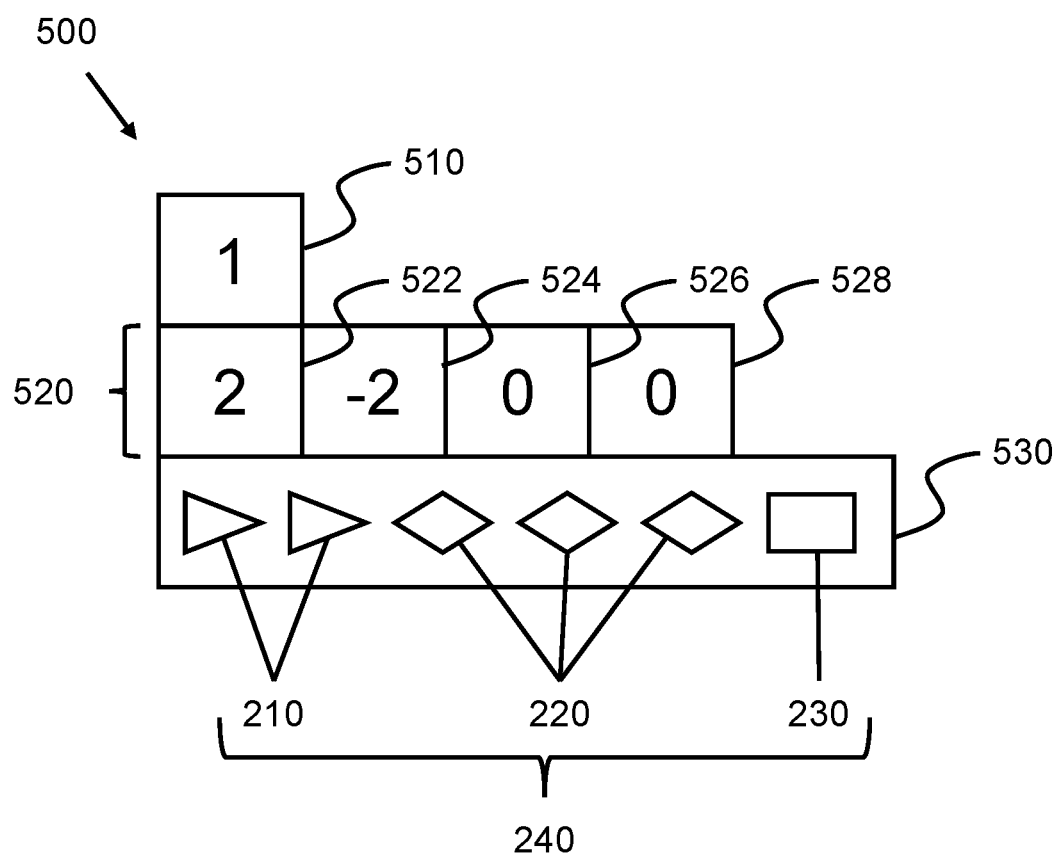

FIG. 8b shows the state of the same packet processing epoch 500 after a programming thread has been executed to commit an update to the packet processing data structure 200, such as that illustrated in FIG. 7, i.e. with objects 240 having been rendered redundant and marked for deletion. Accordingly, the deletion list 530 has now been populated with these objects 240. In the meantime, packet processing threads are continuing execution to further process the same four packets mentioned above, and accordingly the counter elements 522 and 524 now have values "2" and "−2" respectively.

Figure 8C:
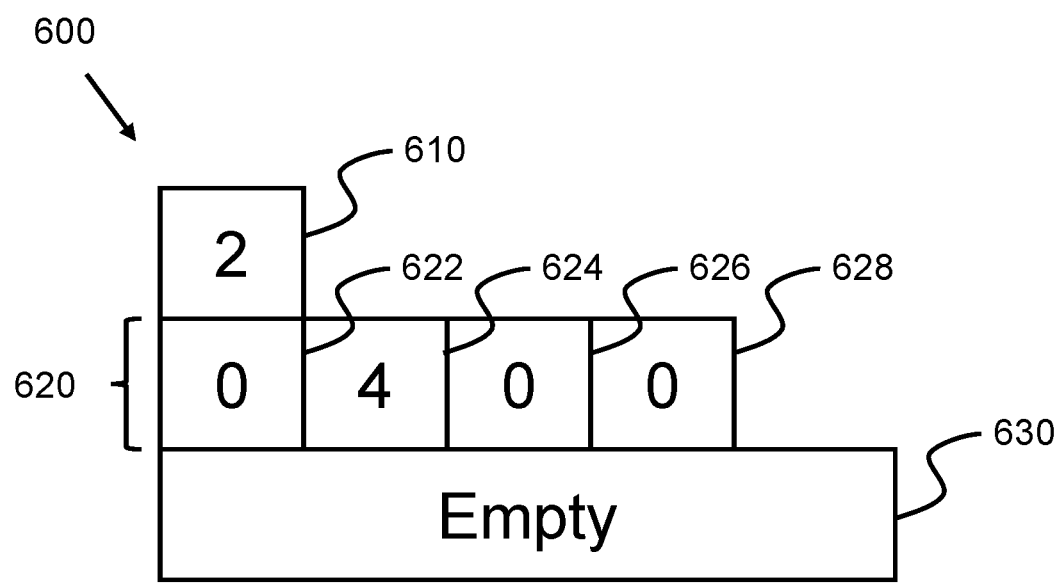

With reference to FIG. 8c, each time an update to the packet processing data structure is committed, as part of the programming thread, a new packet processing epoch 600 is then defined having a sequence number 610 which is incremented from the sequence number 510 of the previous epoch 500. In this example, the sequence number 610 of the new epoch has the value "2", since the immediate previous epoch has a sequence number value "1". The current packet processing epoch 500 is then designated as a past packet processing epoch and in turn the new packet processing epoch 600 is designated as the current packet processing epoch. It should be appreciated that at any one time there is only one current packet processing epoch, generally the most recent packet processing epoch. In embodiments, a packet processing epoch is designated as the current epoch by storing a reference (e.g. pointer) to it as a global variable. This global variable is referenced by the cores executing packet processing threads to identify the current packet processing epoch. In this manner, when cores executing packet processing threads receive a new plurality of packets they will reference the new (now current) packet processing epoch 600, as opposed to the previous (now past) packet processing epoch 500. For example, in FIG. 8c one of the cores executing a packet processing thread has now received a new set of four packets and incremented counter element 624 of the now current packet processing epoch 600 to have a value "4".

Figure 9:
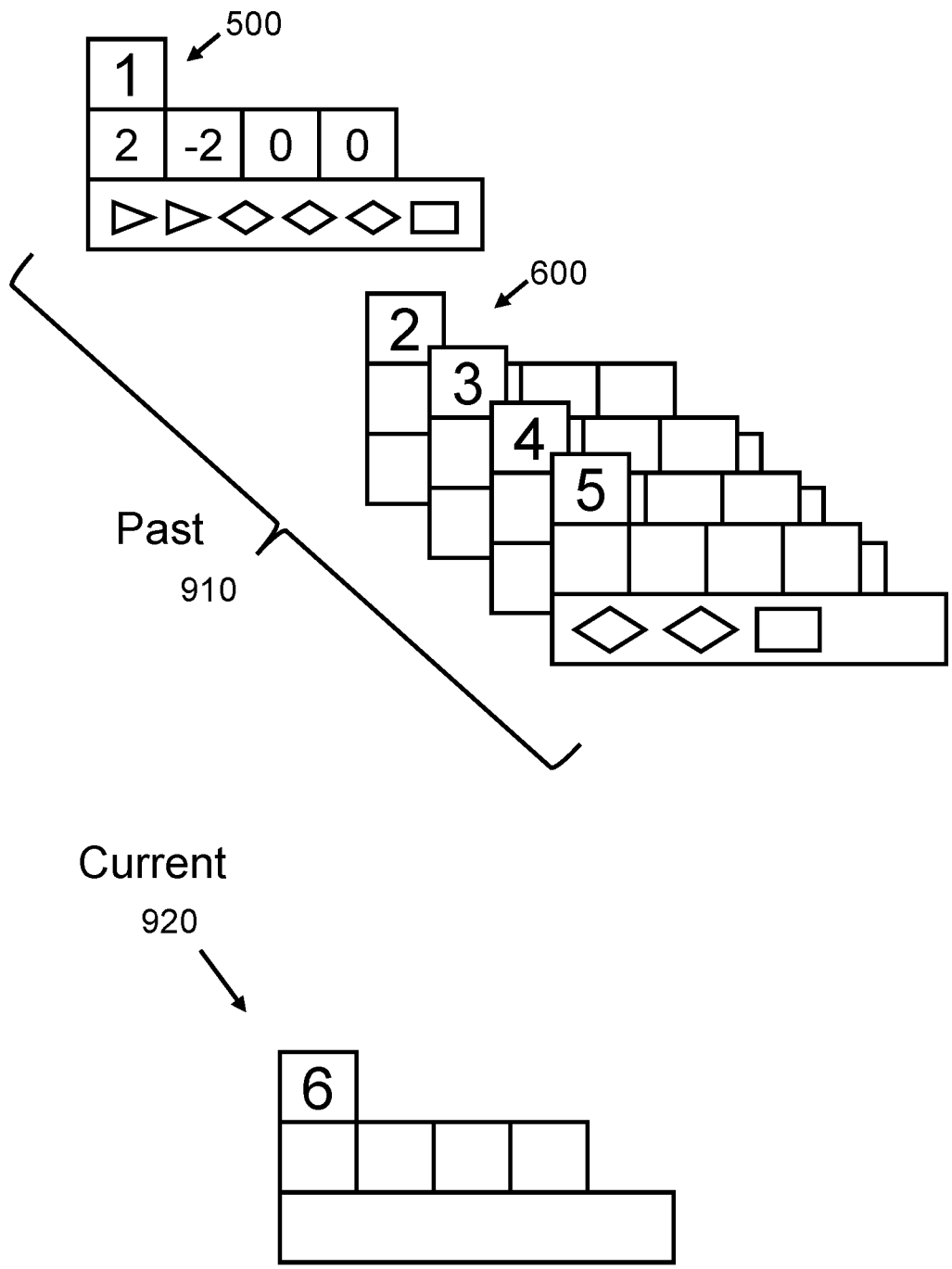
FIG. 9 shows schematically a number of past packet processing epochs and a current packet processing epoch according to embodiments of the present disclosure.

With reference to FIG. 9, the process of creating a new packet processing epoch, designating it as the current packet processing epoch and designating the former current packet processing epoch as a past packet processing epoch occurs each time a new packet processing epoch is created, i.e. each time a programming thread commits an update to the packet processing data structure 200. Accordingly, at times, there may be several past packet processing epochs 910 in memory 150, in addition to the current packet processing epoch 920. For example, there may be three or more past packet processing epochs 910 in memory 150. In embodiments, the number of past packet processing epochs 910 may be four, five, six or many more.

It should be appreciated that up to this point, the objects 240 referenced in the deletion list 530 of the past packet processing epoch 500 have still not actually been deleted from memory 150. Actual deletion of objects 240 from memory 150 is performed by execution of a deletion thread. In general, the deletion thread can be run separately from the packet processing and programming threads, either on one of the same cores which perform packet processing and/or programming or on a separate dedicated core, for example. Specifically, in embodiments, a deletion thread is periodically executed on one of the cores. The deletion thread first establishes that a particular past packet processing epoch 500, 600 from amongst the past packet processing epochs 910 in memory 150 is no longer in use, and then, conditional on it not being in use, it deletes from memory any objects 240 contained in the deletion list 530 of that particular past packet processing epoch. Subsequently, once all objects contained in the deletion list 530 of the particular past packet processing epoch have been deleted, the particular past packet processing epoch itself may be deleted from memory 150. In embodiments, establishing that a particular past packet processing epoch is no longer in use involves establishing that the particular past packet processing epoch is no longer referenced by any packets or by any cores.

In embodiments in which packet processing epochs 300 contain a single counter 320, a particular past packet processing epoch is said to be no longer referenced by any packets when the value of the counter 320 of that past epoch is "0". In embodiments in which packet processing epochs 500 contain a counter 520 comprising multiple counter elements 522, 524, 526, 528, establishing that a particular past packet processing epoch is no longer referenced by any packets involves determining that the sum of the values of all the counter elements is "0". For example, for a past packet processing epoch 500 having counter element values "2", "−2", "0" and "0", the sum of the values is "0" and therefore the epoch is said to be not referenced by any packets. The deletion thread may then proceed to delete objects 240 in the deletion list 530 of that epoch. If the four counter elements had values "4", "0", "0" and "0" respectively, the sum of the values is not "0" and therefore the epoch is said to be still referenced by packets. The deletion thread would therefore not proceed to delete objects 240 in the deletion list 530 of that packet processing epoch in such a case.

In embodiments, as mentioned above, each core which executes packet processing threads records the sequence number of the current epoch in respective memory locations prior to processing a plurality of packets. In embodiments, a particular past packet processing epoch is considered to be no longer referenced by any cores when the sequence numbers recorded in each said memory location are different to the sequence number of that particular past packet processing epoch. For example, with reference to FIG. 9, suppose all cores currently have sequence number "6" recorded in respective memory locations, which could either be local caches 152, 154, 156, 158 or main memory 150. The deletion thread checks the recorded sequence numbers, and, given that none of them has a value "1", for example, establishes that the past packet processing epoch having sequence number "1" is not referenced by any cores.

In embodiments, the deletion thread checks both whether a past epoch is being referenced by any packets and whether it is being reference by any cores. In the example of FIG. 9, since past epoch 500 has counter elements which sum to "0" and since no cores are referencing its sequence number "1", the deletion thread establishes that it is safe to proceed with deleting the objects 240 referenced in the deletion list of past epoch 500 from memory 150, followed by deleting the epoch 500 itself from memory 150. Thus memory is safely freed without having any impact on any packet processing which may be occurring in parallel to the deletion thread.

Embodiments support having an arbitrary number of past packet processing epochs, 910 in addition to the current packet processing epoch 920. For example, in the embodiment illustrated in FIG. 9, there are five past packet processing epochs 910 in memory in addition to the current packet processing epoch 920. Having multiple past packet processing epochs enables deletion of objects to be finer-grained than would be the case if there was, at any one time, only a single past epoch in addition to the current epoch. For example, it may be the case that redundant objects from the oldest of four past packet processing epochs can be deleted, whereas redundant objects from three and two epochs ago are still in use by a threaded process. It should be appreciated that this allows for memory to be freed up rapidly, which is particularly desirable in a high churn environment where the packet processing data structure is constantly being updated.

It should be appreciated that the deletion thread need not necessarily act upon the oldest one of the past packet processing epochs first, i.e. the packet processing epoch having the lowest sequence number (ignoring any integer overflow wrapping). Specifically, in embodiments, the particular past packet processing epoch acted upon by the deletion thread may be more recent than at least one other past packet processing epoch of the plurality of past packet processing epochs. For example, with reference to FIG. 9, the deletion thread may process past packet processing epoch 600 having sequence number "2" before processing past packet processing epoch 500 having sequence number "1".

Figure 10:
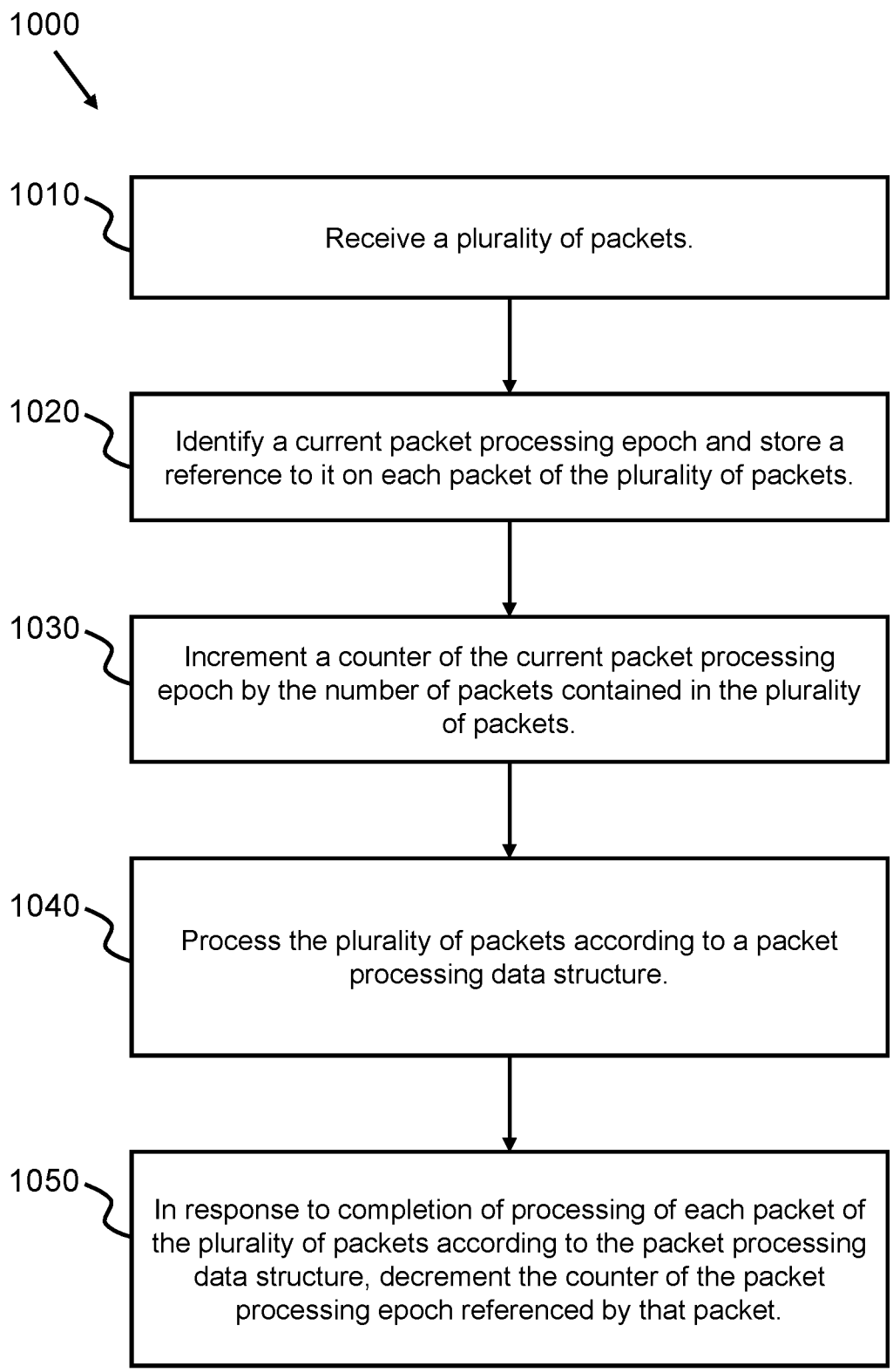
FIG. 10 shows a flow diagram representing operations performed by a packet processing thread according to embodiments of the present disclosure.

Operations performed by the packet processing thread according to embodiments of the disclosure are illustrated with reference to the flow diagram 1000 of FIG. 10. At 1010, a plurality of packets is received, for example via the interface 120. At 1020, the current packet processing epoch is identified and a reference (e.g. pointer) to it is stored on each packet of the plurality of packets. At 1030, the counter of the current epoch is incremented by the number of packets contained in the plurality of packets. At 1040, the plurality of packets is processed according to a packet processing data structure. At 1050, in response to completion of processing of each packet through the plurality of packets according to the packet processing data structure, the counter of the packet processing epoch referenced by that packet is decremented.

Figure 11:
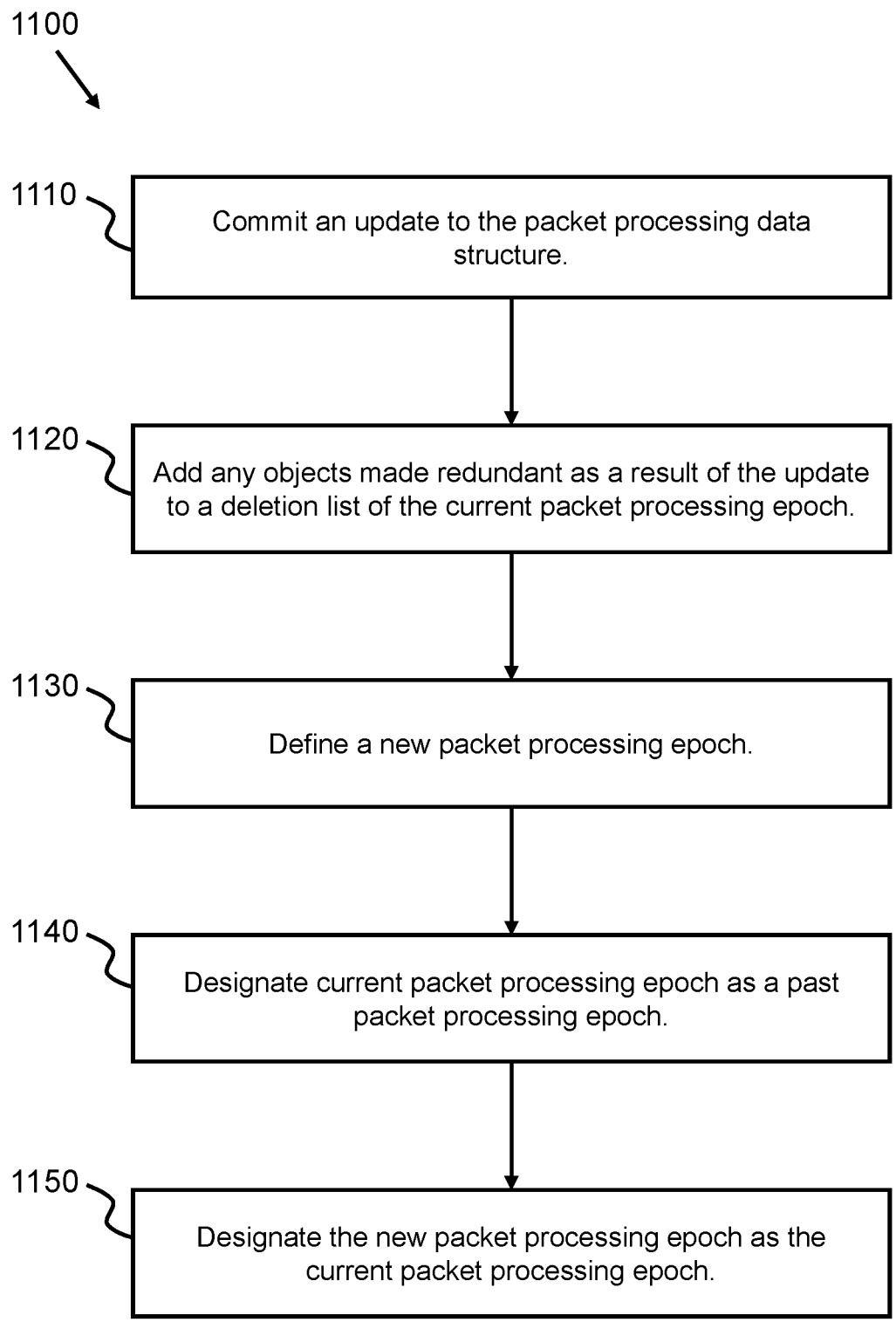
FIG. 11 shows a flow diagram representing operations performed by a programming thread according to embodiments of the present disclosure.

Operations performed by the programming thread according to embodiments of the disclosure are illustrated with reference to the flow diagram 1100 of FIG. 11. At 1110, an update is committed to the packet processing data structure. At 1120, any objects made redundant as a result of the update are added to a deletion list of the current packet processing epoch. At 1130, a new packet processing epoch is defined. At 1140, the current packet processing epoch is designated as a past packet processing epoch. At 1150, the new packet processing epoch is designated as the current packet processing epoch.

Figure 12:
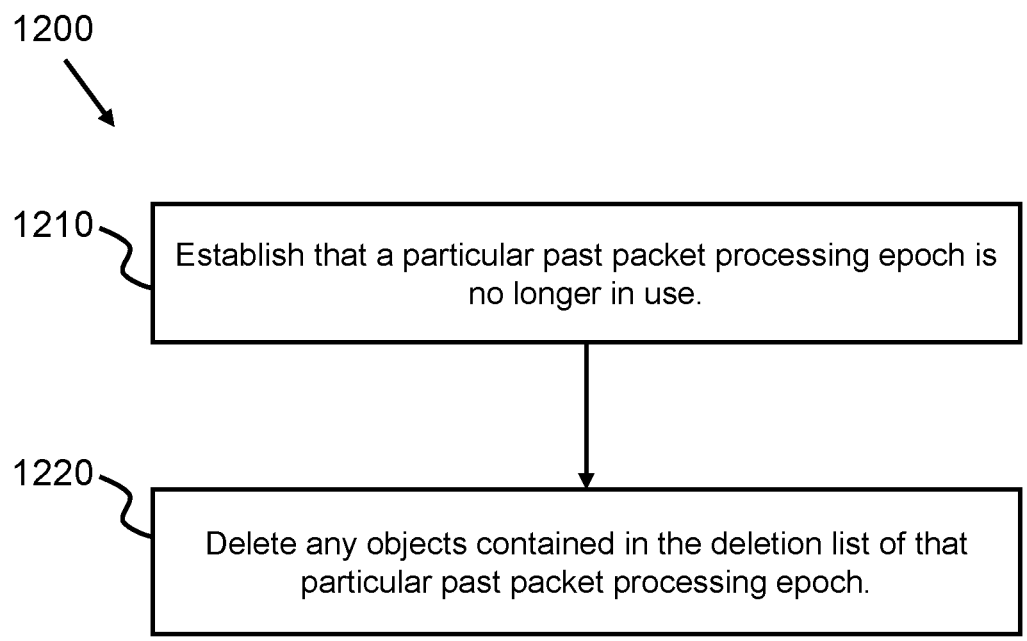
FIGS. 12 and 13 show flow diagrams representing operations performed by a deletion thread according to embodiments of the present disclosure.
Figure 13:
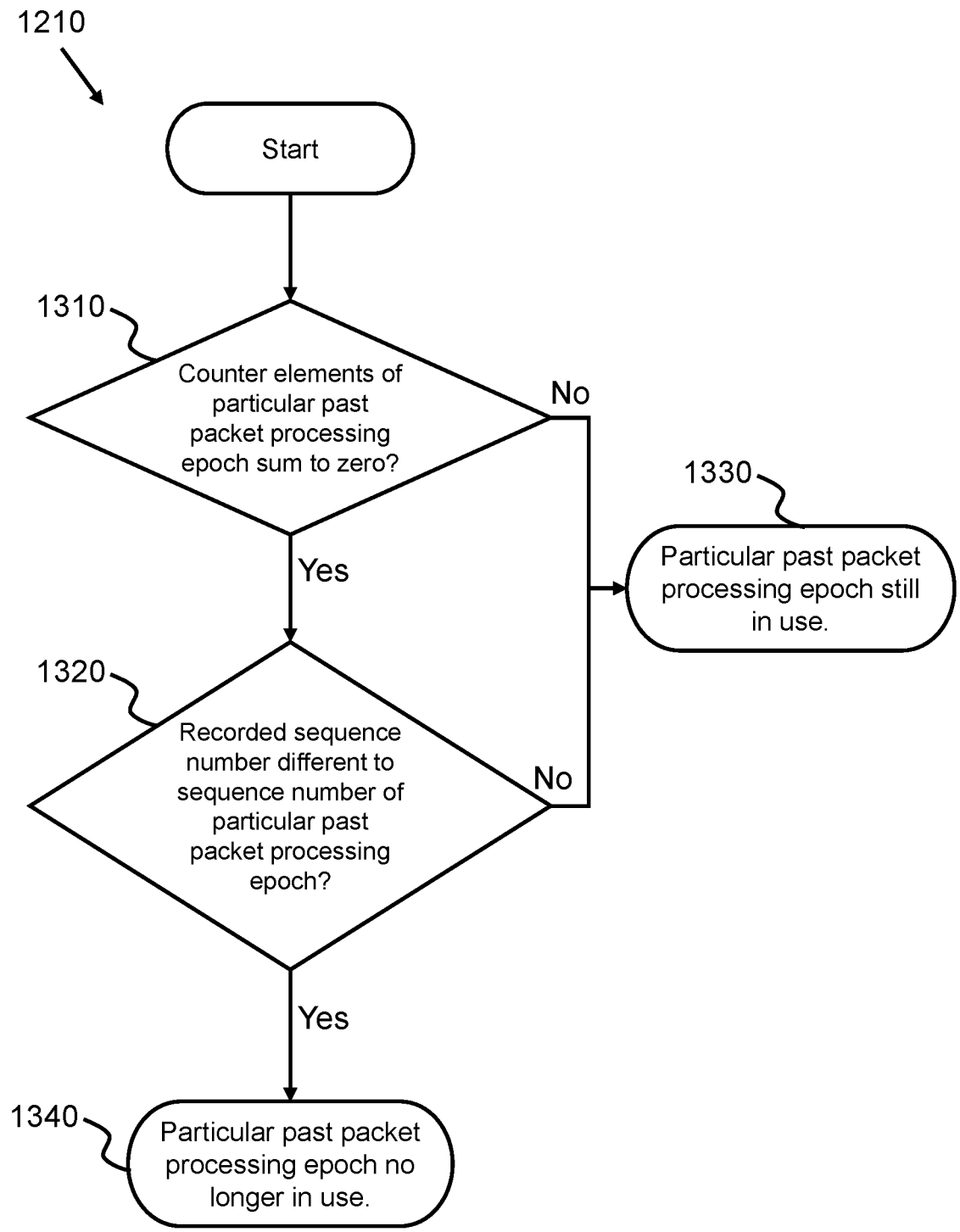

Operations performed by the deletion thread according to embodiments of the disclosure are illustrated with reference to the flow diagram 1200 of FIG. 12. At 1210, the deletion thread establishes that a particular past packet processing epoch is no longer in use. At 1220, any objects contained in the deletion list of that particular past packet processing epoch are deleted. In embodiments, the step 1210 of establishing that a particular past packet processing epoch is no longer in use comprises establishing that the particular past packet processing epoch is no longer referenced by any packets or cores. This is illustrated further with reference to the flow diagram of FIG. 13. At 1310, the deletion thread checks whether the counter elements of the particular past packet processing epoch sum to "0". If they do not sum to "0", then the particular past packet processing epoch is deemed still in use, and any objects contained in the deletion list of that past packet processing epoch should not be deleted. If the counter elements do sum to "0", the deletion thread proceeds to 1320 where it checks whether the recorded sequence number(s) is different to the sequence number of the particular past packet processing epoch. If the recorded sequence number is the same then the past packet processing epoch is deemed to still be in use 1330 and any objects contained in the deletion list of that past packet processing epoch should not be deleted. If the recorded sequence number is different to the sequence number of the particular past packet processing epoch, then the past packet processing epoch is no longer in use 1340 and any objects contained in the deletion list of that past packet processing epoch may be safely deleted from memory, at step 1220 in FIG. 12. It should be appreciated that steps 1310 and 1320 could be performed in the opposite order, or in parallel. Whilst step 1310 in the flow diagram of FIG. 13 refers to counter elements summing to zero, it should be appreciated that in embodiments where the packet processing epoch structure contains a single counter 320, for example as illustrated in FIG. 3, the step 1310 would comprise checking whether the single counter has the value "0".

It should be appreciated that embodiments of the disclosure allow for lock-free deletion of redundant packet processing objects from memory. Indeed, in embodiments, cores involved in executing packet processing threads should encounter no bottlenecking as a result of updates being applied to the packet processing data structure. This enables uninterrupted packet throughput, in addition to more predictable processing time, i.e. reduced jitter in the time taken to process packets through the packet processing data structure. This is important for applications such as, but not limited to, fifth generation ('5G') wireless communications technologies. It should be appreciated that whilst the disclosure refers to packet processing threads, a programming thread and a deletion thread, in embodiments two or more of these threads may be concatenated together. For example, deletion thread processing steps may be performed each time a packet processing thread is executed, and on the same core as the packet processing thread.

Embodiments of the present disclosure may extend to processes other than packet processing, for example other data processing applications such as high-frequency (algorithmic) trading, payment processing, fraud or anomaly detection, internet of things (IoT) analytics, various large scale radio-frequency identification (RFID) deployments, and event streaming processes. In event streaming processes, it can be necessary to handle a continuous stream of data, requiring classification, often with the aim of low latency and high throughput—to which embodiments of the present disclosure are well-suited. Accordingly, the present disclosure also provides a method of processing data, the method comprising: receiving portions of data; at one or more of multiple cores, executing data processing threads comprising: identifying a current data processing epoch and storing a reference (e.g. pointer) to it on each of the portions of data; incrementing a counter of the current data processing epoch by the number of portions of data; processing the portions of data according to a data structure, the data structure comprising one or more objects defining data processing operations; and in response to completion of processing of each portion of data according to the data structure, decrementing the counter of the data processing epoch referenced by that portion of data, at one of the cores, executing a programming thread comprising: committing an update to the data structure, wherein any objects of the data structure which become redundant as a result of the update are added to a deletion list of the current data processing epoch, the deletion list defining objects which can be deleted at a future point in time; and defining a new data processing epoch, designating the current data processing epoch as a past data processing epoch, and designating the new data processing epoch as the current data processing epoch, and at one of the cores, executing a deletion thread comprising: establishing that a particular past data processing epoch is no longer in use and deleting any objects contained in the deletion list of that particular past data processing epoch. Further aspects described herein with reference to packet processing are also applicable to data processing, such as the structure of processing epochs and operation of the deletion thread.

The apparatus 100 described herein may be comprised in or implemented in apparatus comprising a processor or processing system. The processing system may comprise one or more processors and/or memory. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The disclosure presented herein also encompasses the subject matter set forth in the following clauses:

Clause 1. A method of processing packets, the method comprising:
receiving a plurality of packets;
at one or more of multiple cores, executing packet processing threads comprising:
identifying a current packet processing epoch and storing a reference to it on each packet of the plurality of packets;
incrementing a counter of the current packet processing epoch by the number of packets contained in the plurality of packets;
processing the plurality of packets according to a packet processing data structure, the packet processing data structure comprising one or more objects defining packet processing operations; and
in response to completion of processing of each packet of the plurality of packets according to the packet processing data structure, decrementing the counter of the packet processing epoch referenced by that packet,
at one of the cores, executing a programming thread comprising:
committing an update to the packet processing data structure, wherein any objects of the packet processing data structure which become redundant as a result of the update are added to a deletion list of the current packet processing epoch, the deletion list defining objects which can be deleted at a future point in time; and
defining a new packet processing epoch, designating the current packet processing epoch as a past packet processing epoch, and designating the new packet processing epoch as the current packet processing epoch, and
at one of the cores, executing a deletion thread comprising:
establishing that a particular past packet processing epoch is no longer in use and deleting any objects contained in the deletion list of that particular past packet processing epoch.

Clause 2. The method according to clause 1, wherein establishing that a particular past packet processing epoch is no longer in use comprises establishing that the particular past packet processing epoch is no longer referenced by any packets or by any cores.

Clause 3. The method according to any of clause 1 or 2, further comprising, once all objects contained in the deletion list of the particular past packet processing epoch have been deleted, deleting the particular past packet processing epoch itself.

Clause 4. The method according to any of clauses 1 to 3, wherein the particular past packet processing epoch is selected from amongst a plurality of past packet processing epochs.

Clause 5. The method according to any of clauses 1 to 4, wherein the particular past packet processing epoch is more recent than at least one other past packet processing epoch of the plurality of past packet processing epochs.

Clause 6. The method according to any of clauses 1 to 5, wherein the plurality of past packet processing epochs comprises three or more past packet processing epochs.

Clause 7. The method according to any of clauses 1 to 6, wherein establishing that a particular past packet processing epoch is no longer in use comprises determining that the value of the counter of the particular past packet processing epoch is zero.

Clause 8. The method according to clause 7, wherein executing packet processing threads is performed by a plurality of the cores, wherein the counter of each packet processing epoch comprises a corresponding plurality of counter elements, and wherein each counter element is associated with a respective one of the plurality of cores involved in executing packet processing threads.

Clause 9. The method according to clause 7 or 8, wherein the plurality of cores process respective packets of the plurality of packets in parallel.

Clause 10. The method according to any of clauses 7 to 9, wherein one or more of the counter elements assume negative integer values.

Clause 11. The method according to any of clauses 1 to 10, wherein establishing that a particular past packet processing epoch is no longer in use comprises determining that the sum of the values of all the counter elements of the particular past packet processing epoch is zero.

Clause 12. The method according to any of clauses 1 to 11, wherein each counter element is stored at a respective memory location local to the associated core of the plurality of cores.

Clause 13. The method according to any of clauses 1 to 12, wherein each packet processing epoch further comprises a respective sequence number, and the step of defining a new packet processing epoch comprises defining a new packet processing epoch with a sequence number which is incremented from the sequence number of the current packet processing epoch.

Clause 14. The method according to clause 13, wherein the sequence number is subject to integer overflow wrapping.

Clause 15. The method according to clause 13 or 14, further comprising, for each of the one or more cores executing packet processing threads, prior to processing the plurality of packets according to the packet processing data structure, recording the sequence number of the current packet processing epoch at a respective further memory location associated with the respective core.

Clause 16. The method according to any of clauses 1 to 15, wherein establishing that a particular past packet processing epoch is no longer in use comprises determining that the sequence number recorded in each said further memory location is different to the sequence number of that particular past packet processing epoch.

Clause 17. The method according to any of clauses 1 to 16, wherein a packet processing epoch is designated as the current packet processing epoch by storing a reference to it as a global variable, the global variable being referenced by the one or more cores in identifying the current packet processing epoch.

Clause 18. The method according to any of clauses 1 to 17, wherein the packet processing threads are executed in parallel with the programming and deletion threads.

Clause 19. The method according to clause 18, wherein the one or more objects comprise one or more of: a parameter check, a matching operation, and an action taken on the packet.

Clause 20. A computer program product comprising a set of instructions, which, when executed by a computerised device, cause the computerised device to perform a method of processing packets, the method comprising:
receiving a plurality of packets;
at one or more of multiple cores, executing packet processing threads comprising:
identifying a current packet processing epoch and storing a reference to it on each packet of the plurality of packets;
incrementing a counter of the current packet processing epoch by the number of packets contained in the plurality of packets;
processing the plurality of packets according to a packet processing data structure, the packet processing data structure comprising one or more objects defining packet processing operations; and
in response to completion of processing of each packet of the plurality of packets according to the packet processing data structure, decrementing the counter of the packet processing epoch referenced by that packet,
at one of the cores, executing a programming thread comprising:
committing an update to the packet processing data structure, wherein any objects of the packet processing data structure which become redundant as a result of the update are added to a deletion list of the current packet processing epoch, the deletion list defining objects which can be deleted at a future point in time; and
defining a new packet processing epoch, designating the current packet processing epoch as a past packet processing epoch, and designating the new packet processing epoch as the current packet processing epoch, and
at one of the cores, executing a deletion thread comprising:
establishing that a particular past packet processing epoch is no longer in use and deleting any objects contained in the deletion list of that particular past packet processing epoch.

Clause 21. An apparatus for use in processing packets, the apparatus being configured to:
receive a plurality of packets;
at one or more of multiple cores, execute packet processing threads comprising:
identifying a current packet processing epoch and storing a reference to it on each packet of the plurality of packets;
incrementing a counter of the current packet processing epoch by the number of packets contained in the plurality of packets;
processing the plurality of packets according to a packet processing data structure, the packet processing data structure comprising one or more objects defining packet processing operations; and
in response to completion of processing of each packet of the plurality of packets according to the packet processing data structure, decrementing the counter of the packet processing epoch referenced by that packet,
at one of the cores, execute a programming thread comprising:
committing an update to the packet processing data structure, wherein any objects of the packet processing data structure which become redundant as a result of the update are added to a deletion list of the current packet processing epoch, the deletion list defining objects which can be deleted at a future point in time; and
defining a new packet processing epoch, designating the current packet processing epoch as a past packet processing epoch, and designating the new packet processing epoch as the current packet processing epoch, and
at one of the cores, execute a deletion thread comprising:
establishing that a particular past packet processing epoch is no longer in use and deleting any objects contained in the deletion list of that particular past packet processing epoch.

Additionally, the disclosure presented herein also encompasses the subject matter set forth in the following additional clauses:

Clause 1. A method of processing packets by a packet processing system comprising a processor and memory, the method comprising:
receiving a plurality of packets, wherein each packet of the plurality of packets stores a reference to a current packet processing epoch associated with a packet processing data structure, the current packet processing epoch comprising a counter and a deletion list;
setting the counter of the current packet processing epoch to the number of packets contained in the plurality of packets;
processing, by the packet processing system, the plurality of packets according to the packet processing data structure;
in response to processing each packet of the plurality of packets, decrementing the counter to track the number of packets that have been processed;

determining that an object of the packet processing data structure is redundant as a result of an update to the packet processing data structure;

adding the redundant object to the deletion list of the current packet processing epoch;

generating a new packet processing epoch corresponding to the updated packet processing data structure;

in response to determining that the counter indicates that there are no more packets to be processed, deleting the redundant object from the packet processing data structure to generate the updated packet processing data structure;

receiving a subsequent plurality of packets, wherein each packet of the subsequent plurality of packets stores a reference to the new packet processing epoch; and processing the subsequent plurality of packets according to the updated packet processing data structure.

Clause 2. The method according to clause 1, wherein determining that the counter indicates that there are no more packets to be processed is indicative that the past packet processing epoch is no longer referenced by any packets of the plurality of packets.

Clause 3. The method according to any of clause 1 or 2, further comprising:

determining that the redundant object contained in the deletion list has been deleted; and in response to determining the redundant object has been deleted, deleting the past packet processing epoch.

Clause 4. The method according to any of clauses 1 to 3, wherein determining that the counter indicates that there are no more packets to be processed comprises determining that the value of the counter is zero.

Clause 5. The method according to any of clauses 1 to 4, wherein processing the plurality of packets is performed by a plurality of cores, wherein the counter of the current packet processing epoch comprises a plurality of counter elements and wherein each counter element is associated with a respective one of the plurality of cores.

Clause 6. The method according to any of clauses 1 to 5, wherein determining that the counter indicates that there are no more packets to be processed comprises determining that the sum of the values of all the counter elements is zero.

Clause 7. The method according to any of clauses 1 to 6, wherein each counter element is stored at a respective memory location local to the associated core of the plurality of cores.

Clause 8. The method according to clause 7, wherein each packet processing epoch further comprises a respective sequence number, and wherein defining the new packet processing epoch comprises defining the new packet processing epoch with a sequence number which is incremented from the sequence number of the current packet processing epoch.

Clause 9. The method according to clause 7 or 8, further comprising, for each of the one or more cores processing packets, prior to processing the plurality of packets according to the packet processing data structure, recording the sequence number of the current packet processing epoch at a respective memory location associated with the respective core.

Clause 10. The method according to any of clauses 7 to 9, further comprising establishing that the current packet processing epoch is no longer in use by determining that the sequence number recorded in each of the further memory location is different to the sequence number of the current packet processing epoch.

Clause 11. The method according to any of clauses 1 to 10, wherein a packet processing epoch is designated as the current packet processing epoch by storing a reference to it as a global variable, the global variable being referenced by the one or more cores in identifying the current packet processing epoch.

Clause 12. The method according to any of clauses 1 to 11, wherein processing the plurality of packets occurs concurrently with determining that an object of the packet processing data structure is redundant as a result of an update to the packet processing data structure and deleting the redundant object from the packet processing data structure.

Clause 13. The method according to any of clauses 1 to 12, wherein the one or more objects comprise one or more of: a parameter check, a matching operation, and an action taken on the packet.

Clause 14. A system for processing packets comprising:
one or more processors; and
a memory having encoded thereon computer-readable instructions that when executed, cause the one or more processors to:

receive a plurality of packets, wherein each packet of the plurality of packets stores a reference to a current packet processing epoch associated with a packet processing data structure, the current packet processing epoch comprising a counter and a deletion list;

set the counter of the current packet processing epoch to the number of packets contained in the plurality of packets;

process, by the packet processing system, the plurality of packets according to the packet processing data structure;

in response to processing each packet of the plurality of packets, decrement the counter to track the number of packets that have been processed;

determine that an object of the packet processing data structure is redundant as a result of an update to the packet processing data structure;

add the redundant object to the deletion list of the current packet processing epoch;

generate a new packet processing epoch corresponding to the updated packet processing data structure;

in response to determining that the counter indicates that there are no more packets to be processed, delete the redundant object from the packet processing data structure to generate the updated packet processing data structure;

receive a subsequent plurality of packets, wherein each packet of the subsequent plurality of packets stores a reference to the new packet processing epoch; and process the subsequent plurality of packets according to the updated packet processing data structure.

Clause 15. The system according to clause 14, wherein the computer-readable instructions further cause the one or more processors to:

determine that the redundant object contained in the deletion list has been deleted; and in response to determining the redundant object has been deleted, delete the past packet processing epoch.

Clause 16. The system according to any of clauses 14 or 15, wherein each packet processing epoch further comprises a respective sequence number, and wherein defining the new packet processing epoch comprises defining the new packet processing epoch with a sequence number which is incremented from the sequence number of the current packet processing epoch.

Clause 17. The system according to any of clauses 14 to 16, wherein the one or more objects comprise one or more of: a parameter check, a matching operation, and an action taken on the packet.

Clause 18. A non-transitory computer-readable memory having encoded thereon computer-readable instructions that when executed cause one or more processors to:

receive a plurality of packets, wherein each packet of the plurality of packets stores a reference to a current packet processing epoch associated with a packet processing data structure, the current packet processing epoch comprising a counter and a deletion list;

set the counter of the current packet processing epoch to the number of packets contained in the plurality of packets;

process, by the packet processing system, the plurality of packets according to the packet processing data structure;

in response to processing each packet of the plurality of packets, decrement the counter to track the number of packets that have been processed;

determine that an object of the packet processing data structure is redundant as a result of an update to the packet processing data structure;

add the redundant object to the deletion list of the current packet processing epoch;

generate a new packet processing epoch corresponding to the updated packet processing data structure;

in response to determining that the counter indicates that there are no more packets to be processed, delete the redundant object from the packet processing data structure to generate the updated packet processing data structure;

receive a subsequent plurality of packets, wherein each packet of the subsequent plurality of packets stores a reference to the new packet processing epoch; and process the subsequent plurality of packets according to the updated packet processing data structure.

Clause 19. The non-transitory computer-readable memory according to clause 18, wherein the computer-readable instructions further cause the one or more processors to:

determine that the redundant object contained in the deletion list has been deleted; and in response to determining the redundant object has been deleted, delete the past packet processing epoch.

Clause 20. The non-transitory computer-readable memory according to any of clauses 18 or 19, wherein each packet processing epoch further comprises a respective sequence number, and wherein defining the new packet processing epoch comprises defining the new packet processing epoch with a sequence number which is incremented from the sequence number of the current packet processing epoch.

The invention claimed is:

1. A method of processing packets by a packet processing system comprising a processor and memory, the method comprising:

receiving a plurality of packets, wherein each packet of the plurality of packets stores a reference to a current packet processing epoch associated with a packet processing data structure, the current packet processing epoch comprising a counter and a deletion list;

setting the counter of the current packet processing epoch to the number of packets contained in the plurality of packets;

processing, by the packet processing system, the plurality of packets according to the packet processing data structure;

in response to processing each packet of the plurality of packets, decrementing the counter to track the number of packets that have been processed;

determining that an object of the packet processing data structure is redundant as a result of an update to the packet processing data structure;

adding the redundant object to the deletion list of the current packet processing epoch;

generating a new packet processing epoch corresponding to the updated packet processing data structure;

in response to determining that the counter indicates that there are no more packets to be processed, deleting the redundant object from the packet processing data structure to generate the updated packet processing data structure;

receiving a subsequent plurality of packets, wherein each packet of the subsequent plurality of packets stores a reference to the new packet processing epoch; and processing the subsequent plurality of packets according to the updated packet processing data structure.

2. The method of claim 1, wherein determining that the counter indicates that there are no more packets to be processed is indicative that the past packet processing epoch is no longer referenced by any packets of the plurality of packets.

3. The method of claim 1, further comprising:

determining that the redundant object contained in the deletion list has been deleted; and in response to determining the redundant object has been deleted, deleting the past packet processing epoch.

4. The method of claim 1, wherein determining that the counter indicates that there are no more packets to be processed comprises determining that the value of the counter is zero.

5. The method of claim 1, wherein processing the plurality of packets is performed by a plurality of cores, wherein the counter of the current packet processing epoch comprises a plurality of counter elements and wherein each counter element is associated with a respective one of the plurality of cores.

6. The method of claim 5, wherein determining that the counter indicates that there are no more packets to be processed comprises determining that the sum of the values of all the counter elements is zero.

7. The method of claim 5, wherein each counter element is stored at a respective memory location local to the associated core of the plurality of cores.

8. The method of claim 1, wherein each packet processing epoch further comprises a respective sequence number, and wherein defining the new packet processing epoch comprises defining the new packet processing epoch with a sequence number which is incremented from the sequence number of the current packet processing epoch.

9. The method of claim 8, further comprising, for each of the one or more cores processing packets, prior to processing the plurality of packets according to the packet processing data structure, recording the sequence number of the current packet processing epoch at a respective memory location associated with the respective core.

10. The method of claim 8, further comprising establishing that the current packet processing epoch is no longer in use by determining that the sequence number recorded in each of the further memory location is different to the sequence number of the current packet processing epoch.

11. The method of claim 1, wherein a packet processing epoch is designated as the current packet processing epoch by storing a reference to it as a global variable, the global variable being referenced by the one or more cores in identifying the current packet processing epoch.

12. The method of claim 1, wherein processing the plurality of packets occurs concurrently with committing the update to the packet processing data structure and deleting the one or more redundant objects.

13. The method of claim 1, wherein the one or more objects comprise one or more of: a parameter check, a matching operation, and an action taken on the packet.

14. A system for processing packets comprising:
one or more processors; and
a memory having encoded thereon computer-readable instructions that when executed, cause the one or more processers to:
receive a plurality of packets, wherein each packet of the plurality of packets stores a reference to a current packet processing epoch associated with a packet processing data structure, the current packet processing epoch comprising a counter and a deletion list;
set the counter of the current packet processing epoch to the number of packets contained in the plurality of packets;
process, by the packet processing system, the plurality of packets according to the packet processing data structure;
in response to processing each packet of the plurality of packets, decrement the counter to track the number of packets that have been processed;
determine that an object of the packet processing data structure is redundant as a result of an update to the packet processing data structure;
add the redundant object to the deletion list of the current packet processing epoch;
generate a new packet processing epoch corresponding to the updated packet processing data structure;
in response to determining that the counter indicates that there are no more packets to be processed, delete the redundant object from the packet processing data structure to generate the updated packet processing data structure;
receive a subsequent plurality of packets, wherein each packet of the subsequent plurality of packets stores a reference to the new packet processing epoch; and
process the subsequent plurality of packets according to the updated packet processing data structure.

15. The system of claim 14, wherein the computer-readable instructions further cause the one or more processors to:
determine that the redundant object contained in the deletion list has been deleted; and
in response to determining the redundant object has been deleted, delete the past packet processing epoch.

16. The system of claim 14, wherein each packet processing epoch further comprises a respective sequence number, and wherein defining the new packet processing epoch comprises defining the new packet processing epoch with a sequence number which is incremented from the sequence number of the current packet processing epoch.

17. The system of claim 14, wherein the one or more objects comprise one or more of: a parameter check, a matching operation, and an action taken on the packet.

18. A non-transitory computer-readable memory having encoded thereon computer-readable instructions that when executed cause one or more processors to:
receive a plurality of packets, wherein each packet of the plurality of packets stores a reference to a current packet processing epoch associated with a packet processing data structure, the current packet processing epoch comprising a counter and a deletion list;
set the counter of the current packet processing epoch to the number of packets contained in the plurality of packets;
process, by the packet processing system, the plurality of packets according to the packet processing data structure;
in response to processing each packet of the plurality of packets, decrement the counter to track the number of packets that have been processed;
determine that an object of the packet processing data structure is redundant as a result of an update to the packet processing data structure;
add the redundant object to the deletion list of the current packet processing epoch;
generate a new packet processing epoch corresponding to the updated packet processing data structure;
in response to determining that the counter indicates that there are no more packets to be processed, delete the redundant object from the packet processing data structure to generate the updated packet processing data structure;
receive a subsequent plurality of packets, wherein each packet of the subsequent plurality of packets stores a reference to the new packet processing epoch; and
process the subsequent plurality of packets according to the updated packet processing data structure.

19. The non-transitory computer-readable memory of claim 18, wherein the computer-readable instructions further cause the one or more processors to:
determine that the redundant object contained in the deletion list has been deleted; and
in response to determining the redundant object has been deleted, delete the past packet processing epoch.

20. The non-transitory computer-readable memory of claim 18, wherein each packet processing epoch further comprises a respective sequence number, and wherein defining the new packet processing epoch comprises defining the new packet processing epoch with a sequence number which is incremented from the sequence number of the current packet processing epoch.

* * * * *